Figure 6:
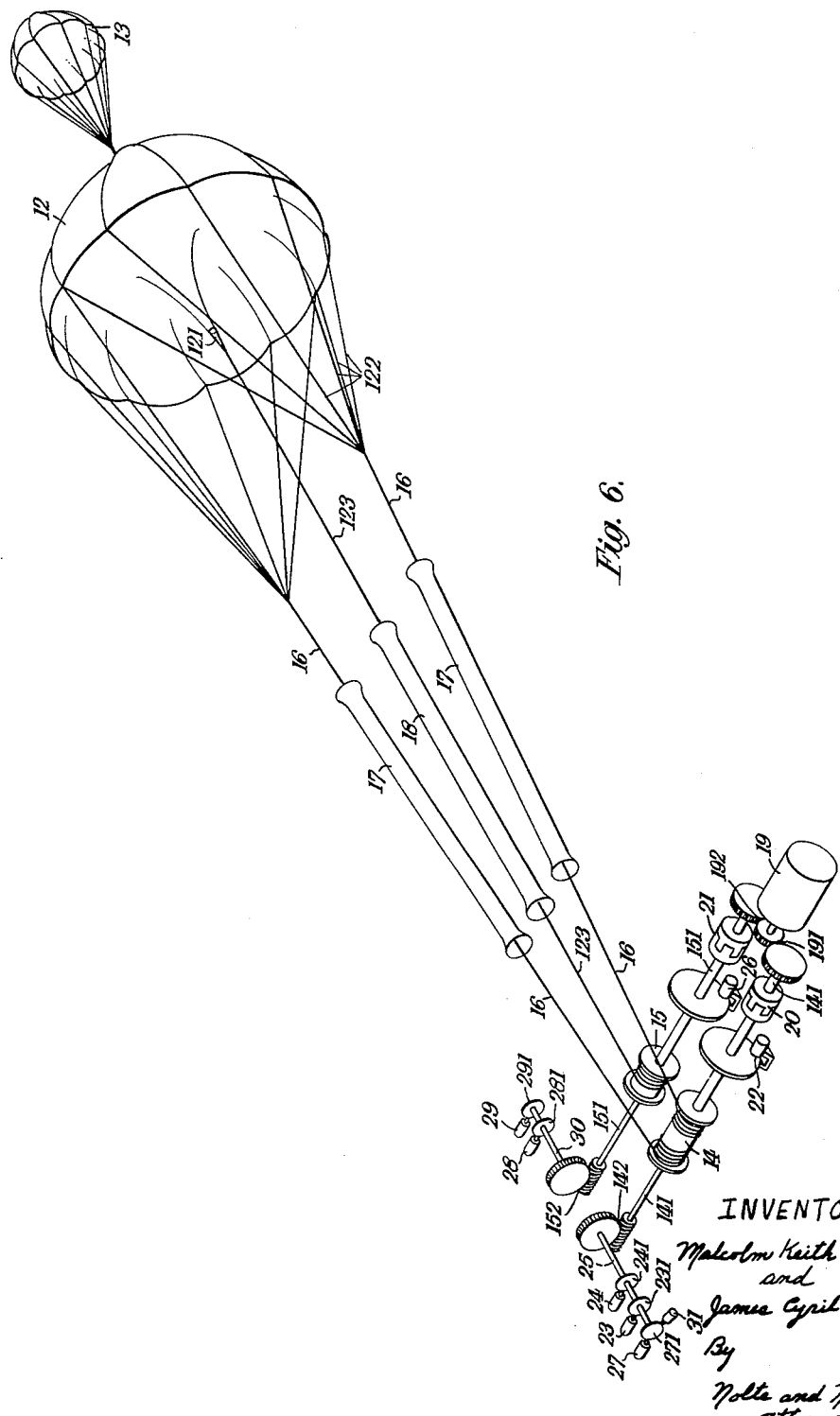

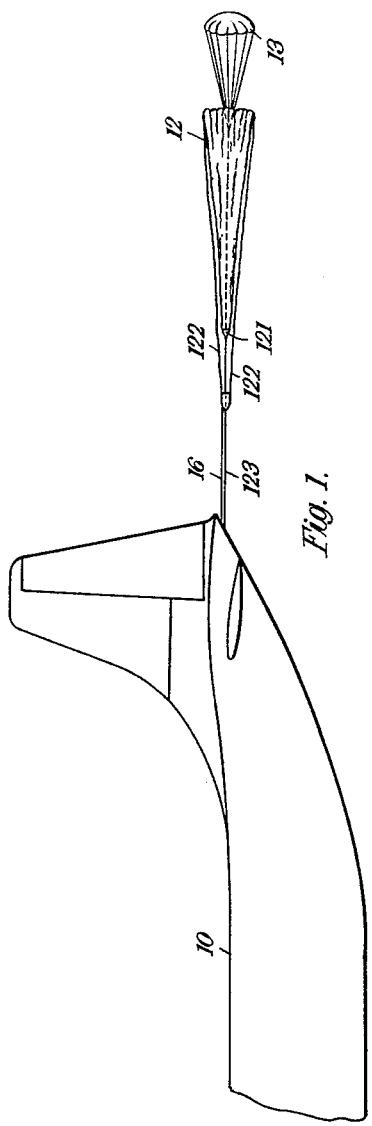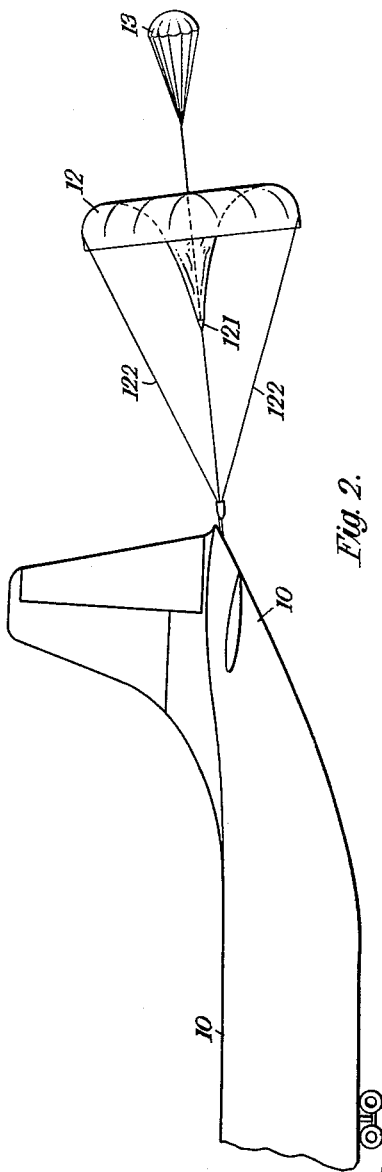

Dec. 7, 1965 M. K. BOWDEN ETAL 3,222,014
PARACHUTE BRAKING APPARATUS FOR AIRCRAFT
Filed March 2, 1964 3 Sheets-Sheet 2
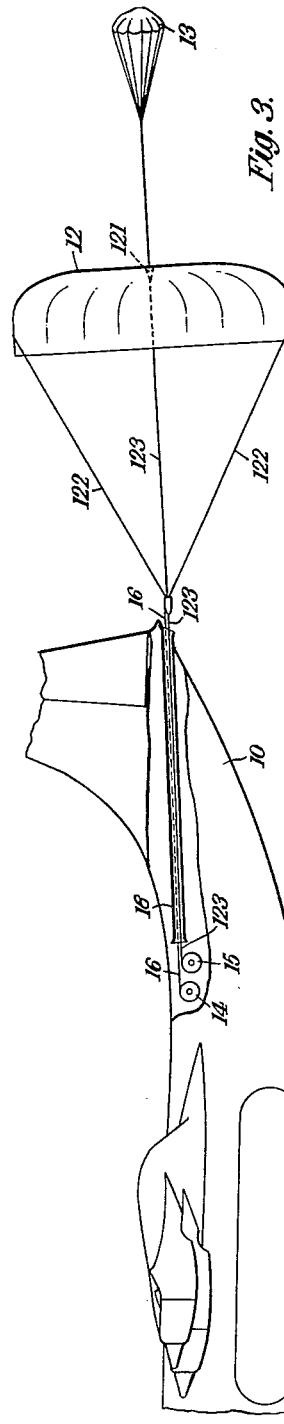
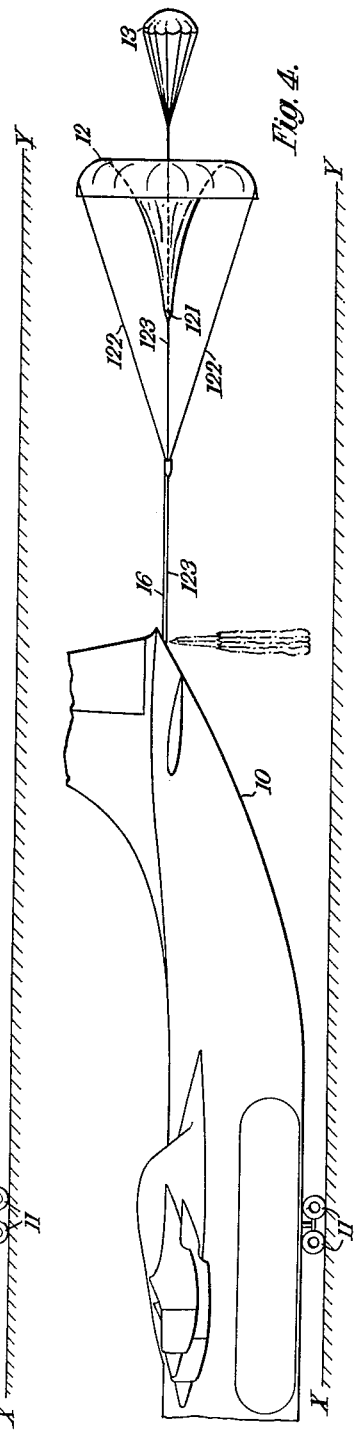
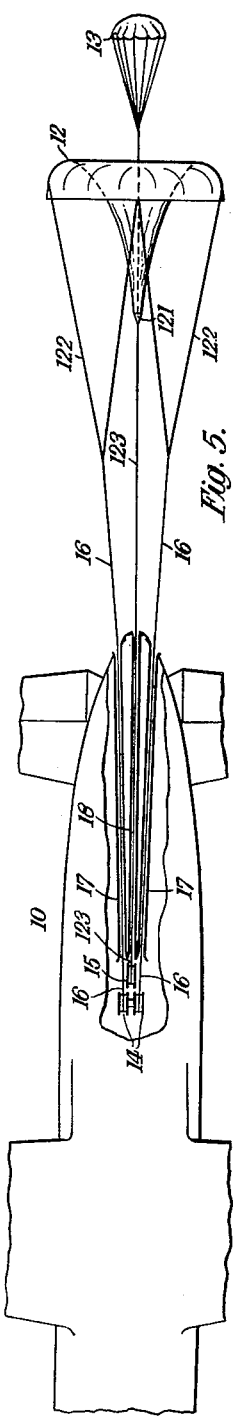

3,222,014
PARACHUTE BRAKING APPARATUS FOR AIRCRAFT

Malcolm K. Bowden and James C. Buck, Belfast, Northern Ireland, assignors to Short Brothers & Harland Limited, Belfast, Northern Ireland, a company of Northern Ireland
Filed Mar. 2, 1964, Ser. No. 348,714
3 Claims. (Cl. 244—113)

The invention is concerned with parachute systems such as are already in common use for braking military aircraft on landing and which may in future be applied to civil aircraft to supplement or replace engine thrust reversal. During the landing approach the drag of a fully deployed parachute is generally excessive, but it has been proposed to use a partially reefed parachute so that by increasing the drag of an aircraft the propulsion engines may be operated at a high power output without increasing the aircraft speed, and in the case of propeller-driven aircraft such an arrangement is advantageous by virtue of the fact that the increased lift generated by the slipstream derived from the engines operating with high power output reduces the landing speed and landing distance required. Further, the use of high engine power and revolution rate in both propeller-driven and jet-propelled aircraft enables maximum power to be attained with a minimum delay in the event of the landing having to be abandoned, although in such case it is obviously necessary to discontinue the high drag of the parachute as rapidly as possible after the decision to abandon the landing.

Existing proposals for controlling the parachute for the above purpose involve its being reefed to control the canopy diameter with the aid of a winch of sufficient power to work against the very high aerodynamic canopy loads, and the rapid response to a required change of configuration is not always obtained.

The object of this invention is to provide an improved parachute braking apparatus which will demand only modest power for its operation and which will avoid the disadvantages of known devices, and for this purpose it is now proposed to use a reversible parachute in combination with auxiliary rigging means for controlling the canopy shape, the arrangement being such that rapid changes in configuration are effected by the aerodynamic loads acting on the canopy which changes in configuration are controlled by the operation of a winch.

The parachute canopy is controlled with regard to its configuration according to requirements by two separately operable means, respectively connected with the apex and the periphery of the canopy, said control means being arranged for differential adjustment whereby variation in the position of the apex is caused to alter the canopy from an introverted condition to a partially or fully deployed condition, or vice versa. The means for controlling the apex of the canopy is preferably actuated by a pilot parachute which is connected thereto, and which is itself operated by power-driven winch mechanism housed in the tail of the aircraft, a second winch mechanism being employed to operate the control means of the periphery of the canopy.

One embodiment of this invention, and the manner of its operation, are hereinafter described with reference to the accompanying diagrammatic drawings, in which FIG. 1 illustrates the relative positions of the parts assumed on the initial deployment of the parachute, or in the event of the abandonment of the landing manoeuvre; FIG. 2 shows the normal braked approach configuration; FIG. 3 illustrates the conditions in a normal landing at touchdown; FIG. 4 illustrates the retraction of the apparatus; FIG. 5 is a fragmentary plan of the apparatus as shown in FIG. 4; FIG. 6 is a schematic illustration of the mechanism employed for reefing the main and pilot parachutes.

In FIGS. 1 to 5 the reference numeral 10 designates the body or fuselage of an aircraft, of which only the tail end is shown, and which is provided with landing wheels 11. In FIGS. 3 and 4 the ground line is shown at X—Y. Stored in a pack housed in a compartment (not shown) in the tail of the fuselage 10 is a parachute, having a canopy 12 of conventional form as illustrated or of a ribbon pattern, to the apex 121 of which is attached a pilot parachute 13.

The parachute 12 is provided, in addition to the usual peripheral rigging lines 122, with an additional line 123 which is attached to the apex 121 in such manner that by changing the length of the line 123 relative to the lines 122, the shape of the canopy 12 may be controlled in the manner to be described.

Mounted within the fuselage 10 are two power-driven winches 14 and 15. The rigging lines 122 are connected to cables 16 which are passed through tubular guides 17 and wound on the winch 14, and the line 123 is passed through a tubular guide 18 and wound on the winch 15. As will be seen from FIG. 6, the two winches 14 and 15 are arranged so that they may selectively be driven by a hydraulic motor 19 which is connected by reduction gear trains 191, 192 to the shafts 141, 151 of said winches, said shafts 141, 151 respectively incorporating clutches 20 and 21. The shaft 141 of the winch 14 has a brake 22 which can be controlled electrically by micro-switches 23, 24, 27 and 31 which are operated as determined by the extent to which the cables 16 have been wound upon or unwound from the winch 14, for which purpose switch-operating cams 231, 241, 271 mounted on a cam-shaft 25 are driven by the winch-shaft 141 through worm and worm-wheel gearing 142. A similar brake 26 is provided on the shaft 151 of the winch 15; this is controlled by micro-switches 28 and 29 which are operated by cams 281, 291 as determined by the extent to which the cable 123 has been wound upon or unwound from the winch 15. Said cams 281, 291 are mounted on a cam-shaft 30 which is driven by the winch-shaft 151 through the worm and worm-wheel gearing 152.

On the initial landing approach the pilot parachute 13 as released and on filling it withdraws the canopy 12 of the main parachute. Both brakes 22 and 26 are applied, so that all the lines 122 and 123 are held and the parachutes occupy the minimum drag position shown in FIG. 1. At this stage the drag on the aircraft is slight, being little greater than that exerted by the parachute 13.

On reaching the final approach phase, the winch 14 is operated to slowly wind in the lines 122, and the line 123 remaining unaltered the effect is to draw the main canopy 12 gradually into the partially reefed configuration shown in FIG. 2, giving the requisite drag characteristic for the landing approach.

After touch down, the winch 14 is released, when the aerodynamic forces acting on the canopy 12 immediately deploy it into the fully developed shape shown in FIG. 3, giving the maximum drag required for braking the aircraft on the ground run.

During the last part of the ground run, when maximum drag by the parachute is no longer required, the winch 14 is released, permitting the cable 16 of the lines 122 to unwind with effect to reef the canopy 12 to a lower drag condition, as shown in FIGS. 4 and 5. Both winches 14 and 15 are then clutched in and driven to wind on both cables 16 and 123, to commence retraction of the entire assembly to prevent its contact with the ground as the aircraft ground speed is diminished. When the aircraft comes to rest the collapsed parachutes are suspended in the position shown in chain-dotted lines in FIG. 4.

If, at any stage of the approach it should become necessary to abandon the landing, the release of the brake 22 pertaining to the winch 14 will immediately free the lines 122 so that they revert to the position shown in FIG. 1, causing the canopy 12 to collapse and, by freeing the aircraft of almost all parachute drag, facilitates the climb away.

The present apparatus has a more rapid response to change in canopy configuration than apparatus hitherto provided in which the control is achieved by direct contraction of the canopy diameter. Thus, the full ground braking effect is available in the minimum time, a particularly valuable advantage in an aircraft having short field length characteristics, in which even a small delay period has a disproportionate effect on the length of the ground roll. In a baulked landing maneuver in which the aircraft climbs away from an approach to landing, a large part of the engine power is devoted to overcome the high drag of a conventional parachute. Consequently the size of parachute is normally limited by the available engine power to overcome this drag. The facility to collapse the parachute and reduce its drag as provided by the present apparatus improves the baulked landing climb performance and also circumvents the above restriction, whereby a larger parachute can be employed to shorten the landing distance.

The low winch power requirement of the improved apparatus permits a valuable economy in the overall weight of the installation in comparison with known forms of parachute braking apparatus.

What we claim as our invention and desire to secure by Letters Patent is:

1. Parachute braking apparatus for aircraft comprising; a first parachute, a second reversible parachute canopy attached to said first parachute adapted to be streamed behind the aircraft, and means for varying the shape of said parachute canopy between a collapsed condition and a fully extended condition, the arrangement being such that the rapid changes in canopy configuration are effected by aerodynamic loads acting on the canopy which changes in configuration are controlled by winch means located in the aircraft through the medium of auxiliary rigging means connected with the canopy, wherein the configuration of the canopy is varied by two separately operable means, respectively connected with the apex of the canopy and with the periphery of the canopy, whereby variation in the position of the apex is caused to alter the canopy from an introverted condition to a partially or fully deployed position and vice versa.

2. Apparatus as claimed in claim 1, wherein the position of the apex of the canopy of the main parachuate is varied by a pilot parachute connected exteriorly thereto and which is itself operated by winch mechanism housed in the aircraft, the control means for the periphery of the canopy being operated by a separate winch likewise housed in the aircraft.

3. Apparatus as claimed in claim 2, wherein the periphery of the main parachute is connected by rigging lines to cable means which are led through tubular guides in the tail of the aircraft to a power-driven winch housed herein, and wherein the apex of the canopy of the main parachute is attached interiorly by cable means led through a separate tubular guide in the tail of the aircraft to a second power-driven winch housed therein, and comprising means for driving said winches selectively, and means for braking said winches individually.

References Cited by the Examiner

UNITED STATES PATENTS 2,972,457  2/1961  Steinthal _____ 244—114
3,113,752  12/1963  Brestel _____ 244—152

FOREIGN PATENTS 912,299  12/1962  Great Britain.

MILTON BUCHLER, *Primary Examiner.*

FERGUS S. MIDDLETON, *Examiner.*

L. C. HALL, *Assistant Examiner.*